United States Patent [19]

Kozel et al.

[11] E Re. 29,863

[45] Reissued Dec. 19, 1978

[54] ANTI-CONTAMINANT DIAPHRAGM VALVE

[75] Inventors: James A. Kozel, Elmhurst; Charles A. De Lew, Des Plaines, both of Ill.

[73] Assignee: The Singer Company, New York, N.Y.

[21] Appl. No.: 735,448

[22] Filed: Oct. 26, 1976

Related U.S. Patent Documents

Reissue of:

[64] Patent No.: 3,872,878
Issued: Mar. 25, 1975
Appl. No.: 425,266
Filed: Dec. 17, 1973

[51] Int. Cl.[2] ..... F16K 31/385

[52] U.S. Cl. ..... 137/242; 251/30; 251/45

[58] Field of Search ..... 251/38, 44, 30, 45, 251/46; 137/242

[56] References Cited

U.S. PATENT DOCUMENTS

| | | | |
|---|---|---|---|
| 3,459,403 | 8/1969 | Royer | 251/46 X |
| 3,593,957 | 7/1971 | Dolter | 251/30 |

*Primary Examiner*—Arnold Rosenthal
*Attorney, Agent, or Firm*—Michael, Best & Friedrich

[57] ABSTRACT

The solenoid plunger normally closes the center vent hole in the diaphragm so inlet pressure is applied through the bleed hole to the space above the diaphragm resulting in enough pressure to close the diaphragm on the valve seat. When the solenoid is actuated, the plunger is lifted, allowing water to flow through the vent faster than it can flow through the bleed hole. This lowers the pressure above the diaphragm so inlet pressure can move the diaphragm from the seat and full flow can take place. The bleed hole is quite small. To prevent entrained particles from reaching and plugging the bleed hole, an arcuate groove having a width less than the bleed hole diameter is molded into the diaphragm to trap particles in the groove and prevent the particles from reaching and closing the bleed hole.

5 Claims, 4 Drawing Figures

ANTI-CONTAMINANT DIAPHRAGM VALVE

Matter enclosed in heavy brackets [ ] appears in the original patent but forms no part of this reissue specification; matter printed in italics indicates the additions made by reissue.

BACKGROUND OF THE INVENTION

Diaphragm operated water valves of the type shown herein are well understood in the art. The center vent hole is customarily made as small as possible to minimize the actuating forces required and, therefore, to reduce the size and expense of the solenoid coil. The bleed hole must be smaller than the pilot hole to insure that the pressure differentials developed across the diaphragm will provide the valve opening and closing function. A typical bleed hole for water valves of the type used in clothes washing machines and the like is 0.030 inches.

These valves are used in domestic water systems and such systems frequently have particles entrained in the water supply. A particle the size of the bleed hole will close off the bleed hole and cause malfunction. If the bleed hole size is increased, sticking of the armature (valve) is likely becuase the larger particles passed through the bleed hole get wedged between the armature and the guide. If the bleed hole is made smaller, a higher incidence of plugged bleed holes occurs due to the vulnerability of a small bleed hole to a wider range of particle sizes.

To minimize the effect of particles in the water, filter screens are mounted in the inlet but if the screen is too fine it constitutes too great a flow restriction. The customary practice today incorporates a rigid plastic insert in which the bleed hole is located. In an effort to restrict access of particles to the bleed hole, one current design employs a multiplicity of holes leading to a conduit in the plastic insert and the conduit leads to the bleed hole. Thus a number of the first holes can become plugged without plugging the actual bleed hole. This design, however, is somewhat costly and is subject to plugging by a finite number of particles, i.e., one per primary hole, and there is little opportunity for this design to, in effect, be self-cleaning to thereby prolong the service life of the valve.

This invention is directed to reducing or eliminating valve failure by reason of plugging the bleed hole.

SUMMARY OF THE INVENTION

The arcuate groove is molded into the rubber face of the diaphragm with the groove intersecting the bleed hole and having a width less than the diameter of the bleed hole results in a construction in which the only particles which can pass through the groove (and thus gain access to the bleed hole) are smaller than the bleed hole and will not plug the bleed hole. Larger particles may become lodged in (or are rejected by) the groove but since the area of the groove is many times larger than the bleed hole area, a considerable blockage of the groove can occur while still allowing sufficient flow through the bleed hole to avoid valve failure. Furthermore, the substantially larger particles will be rejected and pass through the main valve port. Since the particles lodged in the groove are subjected to a washing action by the water flowing through the valve, the particles stand a good chance of being flushed out of the groove, particularly since the groove shape insures that a particle cannot overlie the entire groove and thus set up a pressure differential across the particle holding it in place.

DESCRIPTION OF THE PREFERRED EMBODIMENT

Figure 1:
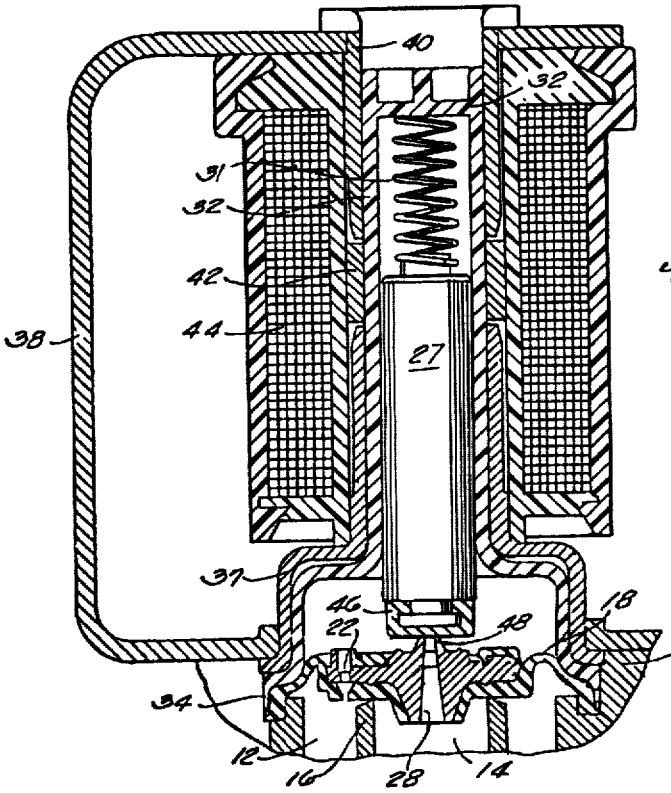
FIG. 1 is a partial vertical section through a water valve incorporating a diaphragm according to this invention.
Figure 2:
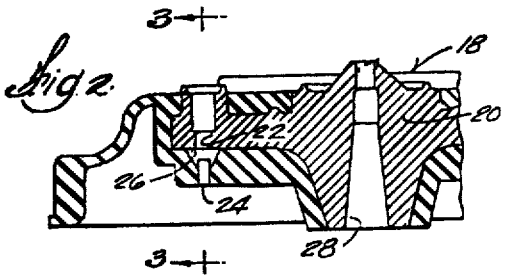
FIG. 2 is an enlarged section showing the diaphragm in greater detail.
Figure 3:
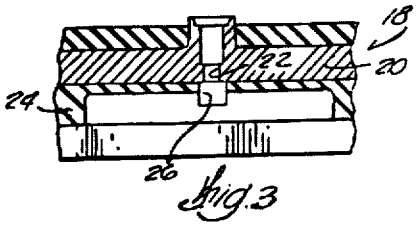
FIG. 3 is a section on line 3—3 of FIG. 2.
Figure 4:
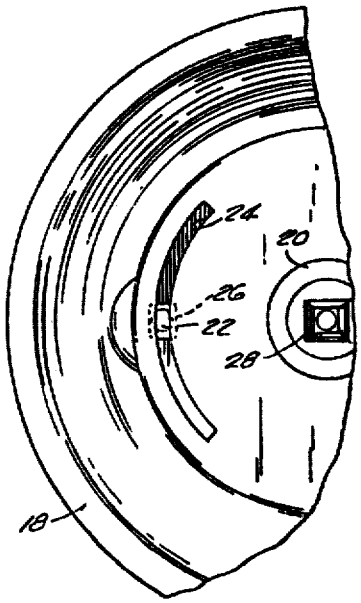
FIG. 4 is a partial plan view of the diaphragm.

The valve body 10 is provided with an annular inlet 12 and an outlet 14 separated by valve seat 16 against which diaphragm 18 seats. The diaphragm 18 incorporates a rigid insert 20. The insert has a bleed hole 22 which is separated from the incoming water by the valve face portion of the diaphragm. This portion of the diaphragm is provided with a groove 24 of about 90° embrace and having a width which is less than the diameter of bleed hole 22. The portion of the rubber diaphragm face immediately under (in the drawing) the bleed hole flares into an enlarged passage surrounding the entrance to the bleed hole 22. This permits any water traveling along the groove to more or less swirl into the enlarged passage 26 with a flushing action to keep the entrance to the bleed hole open. Any particles that may have reached that passage, however, are smaller than the bleed hole 22 simply because the width of the groove 24 is less than the diameter of the bleed hole. Therefore, anything that can pass through the groove can easily pass through the bleed hole.

When the solenoid plunger 27 is seated on the center vent hole 28, water flowing through the bleed hole into the chamber 30 above the diaphragm creates sufficient pressure above the diaphragm to hold the diaphragm firmly on seat 16. The plunger or armature 27 is biased to the seated position by spring 31 and is guided in the plastic guide 32 which flares outwardly above the diaphragm and overlies the edge of the diaphragm with the downturned rim 34 seated on the outturned flange 36 of the diaphragm to securely retain the diaphragm in the housing 10 when the belled portion of the lower flux sleeve member 37 is mounted on the housing 10 by means of frame 38 secured to the housing by means not shown.

The lower flux sleeve 37 has a small diameter portion surrounding a portion of the guide 32. An upper flux sleeve 40 surrounds the upper portion of guide 32 and between the ends of the two flux sleeves 37, 40 there is a non-magnetic, metallic spacer 42 which aids in heat transfer. The purpose of the flux sleeves is to serve as a magnetic flux path concentrating the magnetic flux from the coil 44 to the air gap between the flux sleeves and picking up the upper end of the magnetic stainless steel plunger 27. When the coil is energized, the plunger will be lifted against the force of spring 31. The lower end of the plunger is provided with a resilient face 46 which seats on the raised surface 48 surrounding the center vent hole 28. This means the plunger need not be guided accurately into the seating position and the resilient face will permit particles to be trapped at the seat 48 without adverse effect.

The thin wall plastic sleeve 32 is supported throughout its axial length by the flux sleeves and the spacer 42. This permits the wall thickness to be very small and thus minimizes the air gap between the plunger and the magnetic circuit while obtaining the benefit of the low friction plastic material which, if Nylon is used, also serves to damp or eliminate the usual 60-cycle hum associated with an AC supply to coil 44. The details of the thin wall plastic guide are more fully explained and are claimed in U.S. Pat. No. 3,630,482.

As may be seen, the arcuate groove 24 embraces about 90° and this is adequate to achieve a marked improvement in valve operation and freedom from plugging of the bleed hole. If desired, the slot may be increased in arcuate length to any desired amount or, for that matter, decreased. The passage leading from the bottom slot to the entrance to the bleed hole induces some swirling action preventing any setting of small particles in that area. These small particles are, however, individually unable to plug the bleed hole since the width of the slot is sufficiently smaller than the bleed hole diameter to, in effect, prevent particles with the capacity to plug the bleed hole from reaching the bleed hole. Obviously, many particles can become lodged in the slot and not block the flow to the bleed hole itself. The groove depth is greater than the width so particles lodged in the groove leave a passage under the particle and do not shut off flow to the bleed hole. Furthermore, particles which do become lodged in the groove are subjected to the washing or flushing action of the water swirling into the valve inlet and eventually through the outlet and this affords an opportunity to flush the arcuate groove. This arcuate groove arrangement greatly improves valve performance.

It will be appreciated that the use of this diaphragm is not limited to any particular construction of stem guide, etc. The entire valve structure has been described for the purpose of giving the environment of the diaphragm without limiting use of the diaphragm to a particular valve.

We claim:

1. A solenoid valve comprising a valve body having an annular inlet and an outlet centrally located relative to the inlet, a diaphragm mounted in the body overlying both the inlet and the outlet, a valve seat between the inlet and the outlet [and], *said diaphragm* having a resilient face adapted to close on said seat, a rigid insert molded in the diaphragm, a central valve hole through the diaphragm and insert, a solenoid assembly including a watertight plunger guide and a coil surrounding the guide, the guide cooperating with the diaphragm to define a chamber the contents of which may flow through the vent hole when the hole is open, a plunger slidable in the guide and having a valve portion normally closing the vent hole but movable upon energization of said coil to open the vent hole, a bleed hole in said insert outside the portion overlying said valve seat, a groove in said resilient face communicating with said bleed hole whereby fluid may flow from the inlet through the groove into the bleed hole and then into said chamber, the width of said groove being less than the diameter of the bleed hole whereby entrained particles which pass through the groove will pass through the bleed hole while larger particles are rejected or lodge in the groove.

2. A solenoid valve according to claim 1 including a diverging passage in said resilient face leading from the bottom of the groove to the bleed hole with the large end of the passage being larger than the bleed hole.

3. A solenoid valve according to claim 1 in which the groove is arcuate with its mean diameter generally intersecting the axis of said bleed hole.

4. A solenoid valve according to claim 1 in which the depth of the groove is greater than the width.

*5. A solenoid valve comprising*

*a valve body having an annular inlet and an outlet centrally located relative to the inlet,*

*a valve seat between the inlet and the outlet,*

*a diaphragm mounted in the body overlying both the inlet and the outlet, said diaphragm having a substantially inflexible central portion of greater diameter than the valve seat surrounded by an annular flexible portion, the central portion having resilient face adapted to close on said seat,*

*a cental vent hole through the diaphragm,*

*a solenoid assembly including a watertight plunger guide and a coil surrounding the guide,*

*the guide cooperating with the diaphragm to define a chamber the contents of which may flow through the vent hole when the hole is open,*

*a plunger slidable in the guide and having a valve portion normally closing the vent hole but movable upon energization of said coil to open the vent hole,*

*a bleed hole in said central portion outside the portion overlying said valve seat,*

*a groove in said resilient face communicating with said bleed hole whereby fluid may flow from the inlet through the groove into the bleed hole and then into said chamber,*

*the width of said groove being less than the diameter of the bleed hole whereby entrained particles which pass through the groove will pass through the bleed hole while larger particles are rejected or lodge in the groove.*

* * * * *